Nov. 12, 1957

R. C. STOLTE 2,812,718

FLUID CIRCULATING PUMP

Filed Jan. 16, 1953

INVENTOR
Richard C. Stolte
BY
Willis, Helmig & Baillio
ATTORNEYS

Nov. 12, 1957  R. C. STOLTE  2,812,718
FLUID CIRCULATING PUMP
Filed Jan. 16, 1953  2 Sheets-Sheet 2

INVENTOR
Richard C. Stolte
BY
Willits, Helmig & Baillie
ATTORNEYS

United States Patent Office 2,812,718
Patented Nov. 12, 1957

2,812,718
FLUID CIRCULATING PUMP

Richard C. Stolte, Birmingham, Mich., assignor to General Motors Corporation, Detroit, Mich., a corporation of Delaware Application January 16, 1953, Serial No. 331,559

2 Claims. (Cl. 103—103)

This invention relates to fluid circulating pumps and has particular relation to pumps adaptable for use with engine cooling systems employed for automotive and other purposes.

Pumps which are used for circulating cooling fluid through an engine or for other similar purposes are provided with fluid inlet and outlet passages formed in the pump body at positions determined by the requirements of the pump and associated fluid flow passages of the cooling system. These requirements as they have been incorporated into fluid circulating pumps in the past have provided a rather awkward and space consuming pump structure which often has sacrificed simplicity of construction and efficiency of operation for the sake of adaptability to existing conditions.

Despite the desire for greater adaptability and the sacrifices readily made towards that end, fluid pumps have not beeen developed which are adaptable to changed conditions without extensive redesigning and alteration. Modification of the cooling water jacket about an engine, of the radiator unit, or of the fan assembly invariably necessitate redesigning the entire fluid pump to properly align fluid flow passages to the pump.

Consideration of adaptability, flexibility and compactness of auxiliary engine equipment, such as a fluid circulating pump, is of increasing importance in view of the demand for providing engines which are themselves more readily accommodated in whatever space or location may be provided. It is therefore proposed to provide a fluid circulating pump which will be more compact in construction, simple in operation, efficient in performance and though more standardized in structure, is capable of being easily adapted to varied conditions.

It is an object of this invention to provide a fluid pump which may be made in two parts. One part is intended to comprise concentrically disposed fluid flow passages in coplanar relation with respect to each other which may be readily aligned with fluid inlets and outlets formed in the pump part and any member with which the fluid pump is to be used.

It is one of the objects of this invention to provide an adapter member for use with a fluid circulating pump which has fluid flow passages concentrically disposed and formed therein and may be used to align fluid inlets and outlets in the adaptation of a fluid pump to any engine.

It is another one of the objects of this invention to provide a pump which is more compact and less bulky than pumps previously used for such purposes which may be inexpensively produced, easily installed and readily repaired, replaced or modified with a minimum of effort and expense.

It is a further object of this invention to provide a pump of relatively standardized construction which is nevertheless adaptable to being relocated with a minimum of alteration or modification to itself and with no change being necessary to associated structural members.

Figure 2 is taken substantially in the plane of lines 2—2 on Figure 3 looking in the direction of the arrows thereon.

Figure 1:
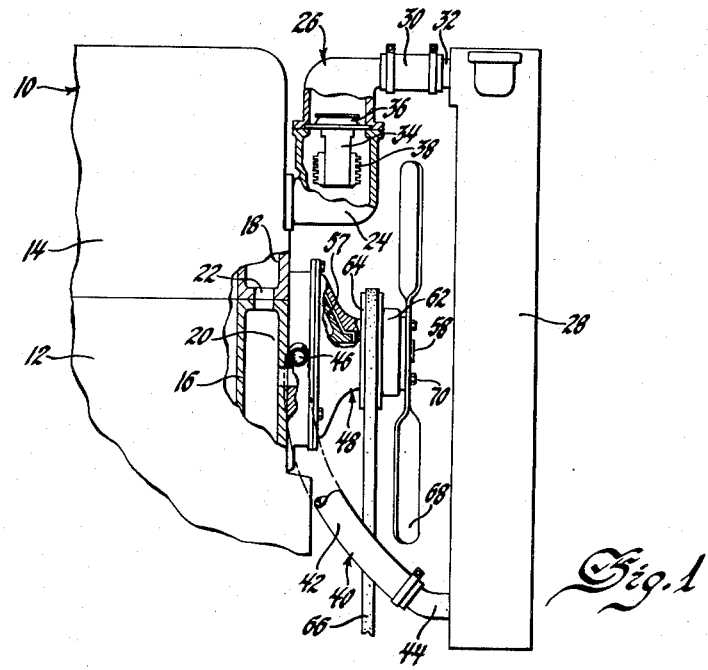
Figure 1 is a fragmentary side elevational view of an engine having an engine cooling system and employing a fluid circulating pump embracing the principals of the invention secured thereto.
Figure 2:
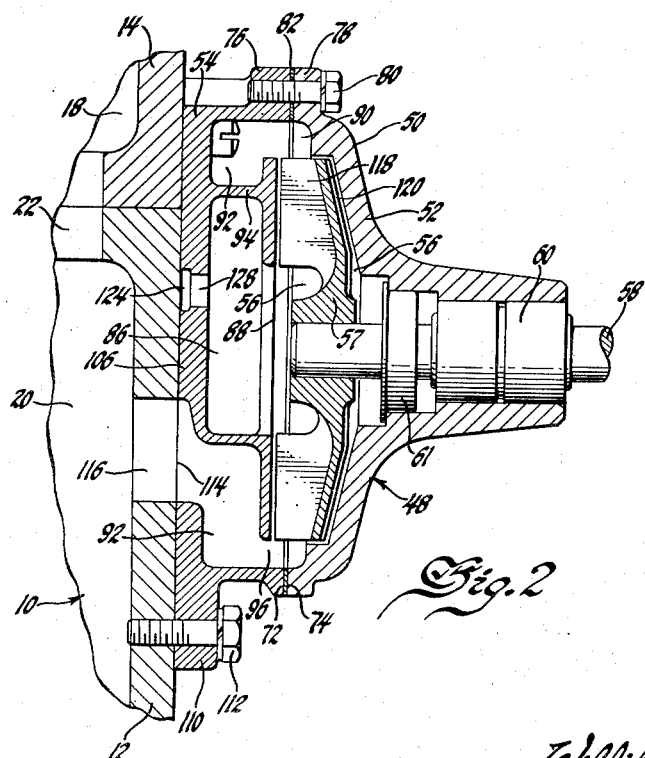
Figure 2 is a fragmentary view of an engine showing a sectional view of a part of an engine and the proposed fluid circulating pump.
Figure 3:
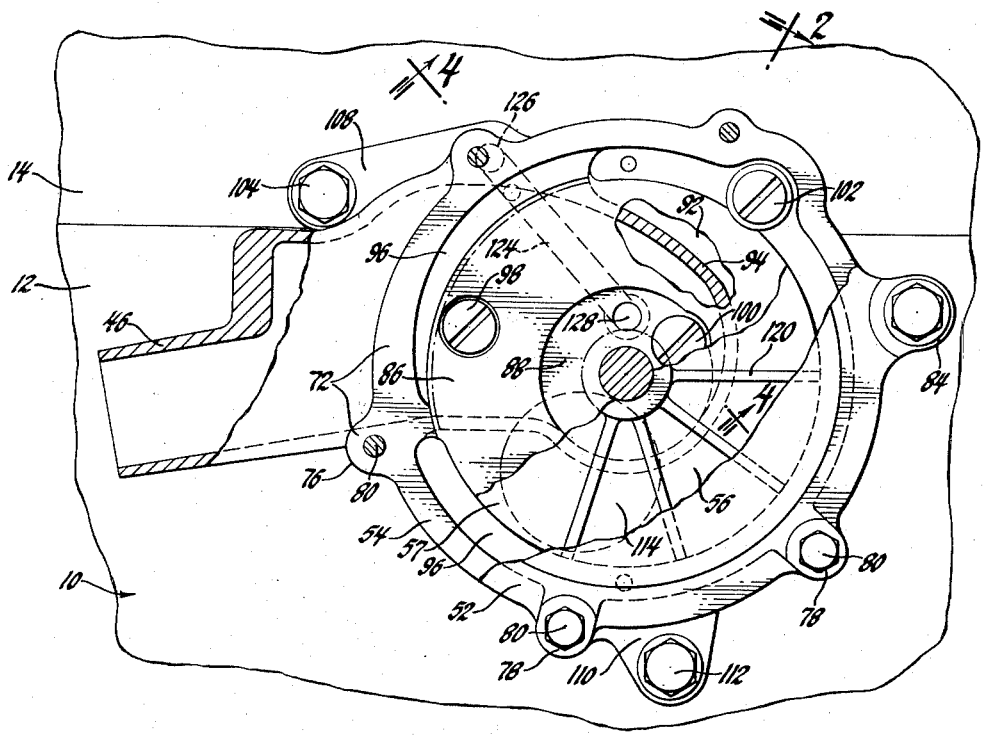
Figure 3 is a fragmentary view of the front of an engine showing the casing of the proposed pump partially broken away so as to better illustrate the pump impeller and fluid flow passages therein.

In the structure disclosed by Figure 1 the engine 10 comprises an engine block 12 and an engine head 14 adapted to be secured together in a conventional manner. The engine 10 comprises a plurality of aligned cylinders 16 which are jacketed as at 18 and 20 within the head and block respectively for the purpose of circulating cooling water or other fluid about the cylinders for cooling the engine. Openings such as 22 are provided between the jackets 18 and 20 of the engine head 14 and the block 12 to provide a restricted flow of cooling fluid between the cavities formed within the jackets.

An outlet passage member 24 in communication with the cooling cavity within the jacket 18 is provided for the flow of cooling fluid through a conduit 26 between the head 14 and the engine radiator 28. The conduit 26 comprises a hose coupling 30 adapted to be connected between the outlet 24 and an inlet tube 32 opening into the radiator 28. Heated cooling fluid within the head 14 is adapted to flow to the radiator 28 through the conduit 26. An engine thermostat or thermostatic valve 34 is mounted within the outlet 24 in such a manner that the valve plate 36 of the thermostatic valve may restrict or prevent the flow of cooling fluid from the engine 10 to the radiator 28 when the valve plate is actuated by expansion or contraction of the bellows 38 of the thermostatic valve.

A cooling fluid return conduit 40, by which cooling fluid may flow from the radiator 28 to the engine 10 comprises a flexible hose 42 adapted to be secured between an outlet tube 44 at the bottom of the radiator and an inlet conduit 46 of a cooling fluid circulating pump 48.

While the casing 50 of the fluid circulating pump 48 may be constructed in any desired manner, in the present instance the casing 50 comprises an impeller housing 52 and a passage member 54. The interior of the impeller housing 52 is formed to provide an impeller chamber 56 adapted to receive a centrifugal impeller or pump 57. The centrifugal impeller or pump 57 is secured to one end of a shaft 58 mounted in a bearing 60 formed in the casing 50 and adjacent one end thereof. Sealing means 61 are disposed about the shaft 58 to seal off the impeller chamber 56. A hub 62 and a pulley 64 are rigidly secured to the outer end of the shaft 58 externally of the casing 50. The pulley 64 may be driven by a belt 66 from a pulley secured to the front end of the crankshaft of the engine 10 or by other suitable means. The hub 62 is ordinarily positioned directly behind the central part of the radiator 28 and may therefore be employed for driving an engine fan 68. The fan 68 may be secured to the hub 62 by any suitable means such as screws indicated at 70.

The impeller housing 52 and the passage member 54 are formed to provide mating adjacent surfaces 72 and 74 adapted to be secured together by any suitable means. In the present instance a plurality of circumferentially spaced tabs 76 and 78 are formed on the passage member 54 and the impeller housing 52 respectively, coadjacent with respect to each other and having holes formed therein receptive to bolt, screw or other fastening means as at 80. A gasket 82 may be interposed between the mating surfaces 72 and 74 to assure positive and water tight engagement of the impeller housing 52 to the passage member 54. The bolts 80 extending through the tabs 76 and 78 may be modified as shown by reference numeral 84 to serve other and additional useful purposes as for connecting a generator support bracket to the fluid pump 48.

An inlet fluid flow passage 86 is formed within the passage member 54 and in communication with the inlet conduit 46 through which cooling fluid flows from the radiator 28. The inlet fluid flow passage 86 extends to the central portion of the passage member 54 and is substantially parallel to the impeller chamber 56 formed in the adjacent impeller housing 52. An inlet opening 88 is formed in the passage member 54 adjacent the impeller housing 52 to provide fluid access from the inlet fluid flow passage 86 to the impeller chamber 56. Fluid flowing through the passage member 54 is discharged centrally into the impeller chamber 56 and is dispersed by the centrifugal impeller 57 mounted in the impeller chamber to the fluid collecting chamber 90 which is formed in the impeller housing 52 concentrically about and in communication with the impeller chamber 56.

An outlet fluid flow passage 92 is formed in the passage member 54 about the inlet fluid flow passage 86 in substantially coplaner relation thereto and separated therefrom by a dividing wall 94 formed in the passage member and between the two fluid flow passages. A circumpositioned passage 96 is formed in the passage member 54 adjacent the fluid collecting chamber 56 and joining the collecting chamber 90 to the outlet fluid flow passage 92.

The passage member 54, with the impeller housing 52 secured thereto as by the bolts 80, is adapted to be secured to the front of the engine 10 by means of bolts 98, 100, 102 and 104 projecting through the back wall 106 of the passage member and into the engine. Two of the bolts 98 and 100 are in this instance located within the inlet fluid flow passage 86 while bolt 102 is located within the outlet fluid flow passage 92 and bolt 104 through a projection 108 of the passage member 54 adapted to provide for the securing means. An additional means of retaining the passage member 54 to the engine 10 is provided by another projection or tab 110 formed on the passage member and having a bolt 112 extended therethrough.

A fluid outlet opening 114 is formed in the back wall 106 of the passage member 54 leading to the outlet fluid flow passage 92 and is aligned with the fluid inlet opening 116 formed in the engine block 12. The fluid inlet opening 116 communicates with the cooling cavity within the jacket 20 and thereby enables cooling fluid to be circulated from the radiator 28 through the pump 48 to the jackets 20 and 18 about the cylinders 16 for cooling the engine. The fluid outlet opening 114 may be formed at any location within the back wall 106 of the passage member 54 so long as it is extended from the outlet fluid flow passage 92 and is in communication therewith. The pump 48 may thus be relocated by relocating the bolts 98, 100, 102, 104 and 112 extending through the passage member 54 and into the engine 10 while using the same fluid inlet opening 116 to the engine or by using the same securing means provided in the passage member and engine and relocating or offsetting the fluid outlet opening 114 formed in the passage member 54 to communicate with the fluid inlet opening 116 in the engine.

Cooling fluid from the radiator 28 enters the inlet fluid flow passage 86 of the passage member 54 by the conduit 40 and is centrally discharged therefrom to the impeller chamber 56. The impeller 57 rotatably mounted within the impeller chamber 56 and externally driven, is provided with a plurality of radially extending and rearwardly projecting blades 118 which centrifugally disperse the cooling fluid to the collecting chamber 90 formed about the impeller chamber. A small vane surface 120 is formed on the impeller 57 opposite the impeller blade 118 to sweep the inner wall of the impeller housing 52 and to assist the impeller blades in centrifugally dispersing all cooling fluid in the impeller chamber to the collecting chamber 90.

The cooling fluid from the collecting chamber 90 enters the passage 96 formed in the passage member 54 and adjacent the collecting chamber.

The passage 96 extends transversely across the inlet fluid flow passage 86, separated therefrom by an interposed wall 122, to connect to the outlet fluid flow passage 92 to which cooling fluid is discharged. The coolant flows from the outlet flow passage 92 of the passage member 54 into the cooling jacket 20 formed within engine block 12 through the cooling cavities formed in the engine head 14 and about the engine cylinders 16. The cycle of the cooling fluid is completed by the flow of cooling fluid through the conduit 26 from the engine 10 to the radiator 28.

Figure 4:
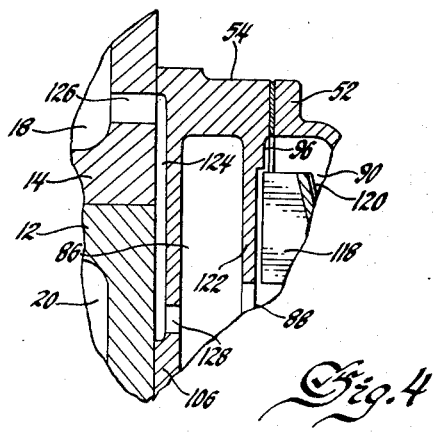
Figure 4 is a fragmentary view of an engine showing a cross-sectional view of a part of the engine and the fluid pump taken substantially in the plane of line 4—4 on Figure 3 looking in the direction of the arrows thereon.

In order to enable the continuous flow of cooling fluid through the engine 10, even when the engine thermostat 34 has restricted or prevented fluid flow through the conduit 26, a bypass passage 124, as shown in Figure 4, is formed in the back wall 106 of the passage member 54 to join the cooling cavity in the engine head 14 to the inlet fluid flow passage 86 of the pump 48. Cooling fluid will flow through an opening 126 formed in the cooling cavity jacket 18 about the engine head through the bypass passage and into an opening 128 formed in the passage member 54 and communicating with the inlet fluid flow passage 86.

I claim:

1. A centrifugal fluid circulating pump including a pump member having an impeller chamber therein and a fluid impeller rotatably disposed within said chamber, a separate passage member having a peripheral side wall and a back wall, said pump and passage members having mating adjacent surfaces secured together in a plane spaced from and substantially parallel to said back wall, means in said side wall providing an inlet access to said passage member, means within said passage member forming an inlet passage therein in communication between said inlet access and the inlet said of said pump member for passing fluid to said pump member and into said impeller chamber, and means forming an outlet passage having a portion within said passage member circumferentially disposed wholly about said inlet passage and a further portion within said pump member communicating with said impeller chamber and circumferentially disposed about said impeller, said back wall having an outlet opening therein extending substantially axially therethrough and communicating with said outlet passage.

2. A centrifugal fluid circulating pump as defined by claim 1 wherein said impeller is disposed partly within said pump member and partly within said passage member.

References Cited in the file of this patent

UNITED STATES PATENTS

| | | |
|---|---|---|
| 705,347 | Harris | July 22, 1902 |
| 717,096 | Harris | Dec. 30, 1902 |
| 1,434,348 | Bull | Oct. 31, 1922 |
| 1,519,155 | Moorhouse | Dec. 16, 1924 |
| 1,662,249 | Jennings | Mar. 13, 1928 |
| 1,684,490 | Henderson | Sept. 18, 1928 |
| 1,817,169 | Schwitzer et al. | Aug. 4, 1931 |
| 1,861,839 | Burks | June 7, 1932 |
| 1,954,090 | Moorhouse | Apr. 10, 1934 |
| 2,085,810 | Ljungstrom | July 6, 1937 |
| 2,134,686 | De Lancey | Nov. 1, 1938 |
| 2,343,486 | Stepanoff | Mar. 7, 1944 |